United States Patent [19]

Goehlich et al.

[11] 4,328,393
[45] May 4, 1982

[54] CABLE FITTING WITH AN ELASTIC INSULATOR AND METALLIC HOUSING

[75] Inventors: Lothar Goehlich; Klaus Kretschmer, both of Berlin, Fed. Rep. of Germany

[73] Assignee: Siemens Aktiengesellschaft, Berlin & Munich, Fed. Rep. of Germany

[21] Appl. No.: 214,050

[22] Filed: Dec. 8, 1980

[30] Foreign Application Priority Data

Dec. 20, 1979 [DE] Fed. Rep. of Germany ....... 2951727

[51] Int. Cl.³ .......................................... H02G 15/184
[52] U.S. Cl. ................................................. 174/73 R
[58] Field of Search .......................... 174/73 R, 73 SC

[56] References Cited

FOREIGN PATENT DOCUMENTS 2726402  12/1978  Fed. Rep. of Germany .... 174/73 R

Primary Examiner—Laramie E. Askin
Attorney, Agent, or Firm—Kenyon & Kenyon

[57] ABSTRACT

In order to ensure a tight feed-in of the cable end in a fitting for plastic insulated electric cables, which includes an elastic, prefabricated insulator with a metallic housing, even if the cable is bent, a circular slot, the depth of which corresponds approximately to the length of the cylindrical base part of a control deflector embedded on the inside in the end of the insulating body of the insulator, is made in the cylindrical end of the insulator at the end face. The slot separates the elastic control part of the fitting into a mechanically effective and an electrically effective region.

1 Claim, 1 Drawing Figure

U.S. Patent        May 4, 1982        4,328,393
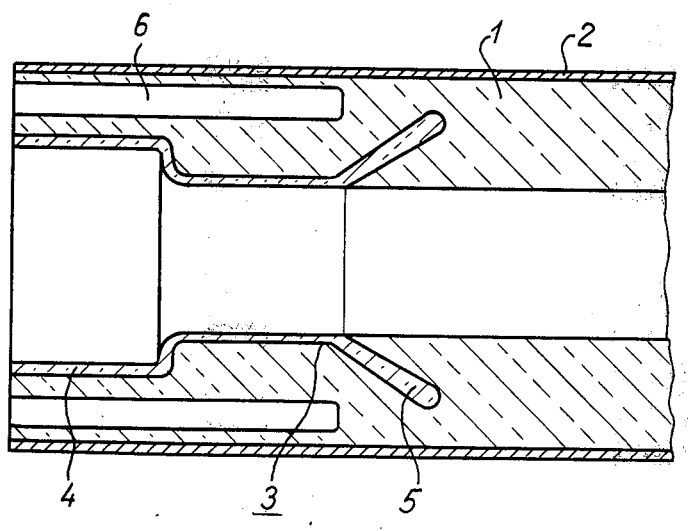

CABLE FITTING WITH AN ELASTIC INSULATOR AND METALLIC HOUSING

BACKGROUND OF THE INVENTION

This invention relates to fittings for plastic insulated electric cables in general and more particularly to the mechanical design of prefabricated fittings or fitting parts with an elastic insulator and metallic housing.

For plastic insulated medium and high voltage cables, especially for those with insulation of thermoplastic or cross-linked polyethylene, fittings and fitting parts have recently been developed which are pushed onto a suitably prepared cable end or are plugged into appropriately prepared cable ends. These fittings and fitting parts consist substantially of an elastic insulator made of an ethylene-propylene terpolymer rubber or silicone rubber which is provided with elements for controlling the electric field. The fitting has an internal hole which is smaller than the outside diameter of the respective, prepared cable conductor. The fitting part, when pushed onto the cable conductor, or when a cable end is plugged into a fitting part, is elastically expanded sufficiently that a press fit without voids is obtained on the conductor insulation. The press fit at the same time provides a seal against moisture. In order to make such fittings and fitting parts otherwise safe against accidental contact, or in order to permit a metallic connection of the cable shields through the fitting, provision has also been made to surround the elastic insulators with a tubular metallic housing.

SUMMARY OF THE INVENTION

The present invention is based on the discovery that, while in such fittings and fitting parts the press fit of the insulator on the respective cable conductor also ensures a seal of the cable lead-in, this seal is jeopardized if the cable is bent. If such occurs, the cylindrical end of the insulator cannot follow such bends but is deformed.

Starting from a fitting for plastic insulated electric cables, which consists of an elastic, prefabricated insulator which is provided with a hole and optionally contains a connecting element and which has at least one cylindrical end with an internally embedded control deflector of elastomer material and is surrounded by a metallic housing, it is accordingly the object of the present invention to further develop the design of the fitting so that tight contact of the insulator with the cable conductor is ensured in the area of the cable lead-in, even if the cable is bent.

According to the present invention, to solve this problem, a circular slot is made in the cylindrical end of the insulator concentrically to the axis of the insulator. The depth of the slot corresponds approximately to the length of the cylindrical base part of the control deflector.

Through the slot provided according to the present invention, the part of the insulator surrounding the control deflector is designed so that it is separated into a mechanically effective and an electrically effective region, the two regions being separated by a movable zone. The mechanically effective region is movable and can therefore elastically follow potential flexing of the cable without mechanically influencing the electrically effective region which is held firmly in the metallic housing. The mechanically effective movable region is otherwise shaped by the circular slot in such a way that, if liquid is present on the outside, it is surrounded by this liquid. With increased liquid pressure, a self-reinforcing action of the seal is thereby obtained.

BRIEF DESCRIPTION OF THE DRAWING

The single FIGURE is a cross sectional view of the cable fitting according to the present invention.

DETAILED DESCRIPTION

The FIGURE shows the end of a sleeve which consists substantially of an elastic insulator 1 and metallic housing 2 which surrounds insulator 1. The housing 2 can be made radially elastic by using axially extending slots.

A control deflector 3 of electricaly conducting elastic material is embedded into the cylindrical end of the sleeve on the inside. The control deflector 3 consists of a cylindrical base part 4 provided with a step, and a conical part 5. Between the base part 4 of the control deflector and the metallic housing 2, a circular slot 6 is formed in the insulator 1 at the end face, concentrically to the axis of the insulator. The depth of this slot corresponds approximately to the length of the cylindrical base part 4. Because of the slot 6, the cross section of the insulator 1 is weakened in the vicinity of the base part 4 so that the part of the insulator 1 located inside the circular slot 6 is movable. This part, which forms the cable lead-in, can follow the bending of the cable to the extent of the width of the slot without jeopardizing the press fit of the insulator 1 on the respective cable conductor in the conical region of the control deflector 3 as well as in the region of the base part 4.

What is claimed is:

1. In a fitting for plastic insulated electric cables, especially for medium and high voltage cables, comprising an elastic, prefabricated insulator provided with a hole and which has at least one cylindrical end with a control deflector of elastomer material embedded on the inside, said deflector having a cylindrical base part followed by conical part, and a metallic housing surrounding the insulator, the improvement comprising a circular slot concentric to the axis of the insulator formed in the cylindrical end of the insulator at the end face, and the depth of said slot corresponding approximately to the length of the cylindrical base part of the control deflector.

* * * * *